United States Patent [19]
Yanagihara et al.

[11] Patent Number: 4,925,091
[45] Date of Patent: May 15, 1990

[54] VEHICLE ENGINE WARMING AND PASSENGER COMPARTMENT HEATING DEVICE

[75] Inventors: Hiromichi Yanagihara; Sumio Ito; Kazuhiro Sakurai, all of Gotemba; Kouichi Akita, Susono, all of Japan

[73] Assignee: Toyota Jidosha Kabushiki Kaisha, Japan

[21] Appl. No.: 299,417

[22] Filed: Jan. 23, 1989

[30] Foreign Application Priority Data

Feb. 8, 1988 [JP] Japan .................................. 63-25757
Feb. 16, 1988 [JP] Japan .................................. 63-31732
Feb. 16, 1988 [JP] Japan .................................. 63-31733

[51] Int. Cl.$^5$ ............................................. G05D 23/00
[52] U.S. Cl. .................................. 237/2 A; 237/12.3 A
[58] Field of Search ................... 237/12.3 R, 12.3 A, 237/12.3 C, 2 A, 12.3 B; 123/528, 559.2, 142.5 R

[56] References Cited

FOREIGN PATENT DOCUMENTS 59-160063 9/1984 Japan .

Primary Examiner—Henry Bennett
Attorney, Agent, or Firm—Oliff & Berridge

[57] ABSTRACT

A device for heating the passenger compartment and warming up the engine, including a turbo heater having a blower and a turbine driven by the exhaust gas of the engine. The turbo heater is operated as soon as the engine is started. Hot air discharged from the blower is fed into the engine soon after the engine is started, and the hot air discharged from the blower is fed into the passenger compartment. When the temperature of the engine coolant become high, the operation of the turbo heater is stopped.

19 Claims, 15 Drawing Sheets

VEHICLE ENGINE WARMING AND PASSENGER COMPARTMENT HEATING DEVICE

BACKGROUND OF THE INVENTION

1. Field of the Invention

The present invention relates to a vehicle engine warming and passenger compartment heating device.

2. Description of the Related Art

Known in the art is an internal combustion machine wherein, upon engine startup, air heated by passage through the engine exhaust manifold is fed into the engine cylinders (see Japanese Unexamined Patent Publication (Kokai) No. 59-160063). Nevertheless, it is not possible to sufficiently heat air just after startup by passage thereof through the exhaust manifold, due to the low temperature of the exhaust manifold at that time, and therefore, it is not possible to feed sufficiently heated air to the inside of the engine cylinders just after startup. As a result, not only is it not possible to ensure an easy startup of a diesel engine, but also problems arise due to the generation of large amounts of unburnt hydrocarbons and the resultant generation of white smoke and foul odor, and in gasoline engines, the emission of large amounts of unburnt hydrocarbons.

SUMMARY OF THE INVENTION

The object of the present invention is to provide an engine warming and passenger compartment heating device which ensures an easy engine startup and rapid warming of the passenger compartment.

According to the present invention, there is provided a device for heating a driver's compartment and warming up an engine having an intake passage and an exhaust passage, the device comprising: turbo heater having a blower and a turbine connected to the blower and driven by exhaust gas discharged from the engine into the exhaust passage to discharge hot air from a discharge side of the blower; a hot air passage connected to the driver's compartment; selective connecting means for selectively connecting the discharge side of the blower to the hot air passage or the intake passage; and control means for controlling the selective connecting means to connect the discharge side of the blower to the intake passage for a predetermined period after the engine is started and to connect the discharge side of the blower to the hot air passage after the predetermined period has elapsed.

The present invention will be more fully understood from the description of the preferred embodiments of the invention set forth below, together with the accompanying drawings.

DESCRIPTION OF THE PREFERRED EMBODIMENTS

Figure 1:
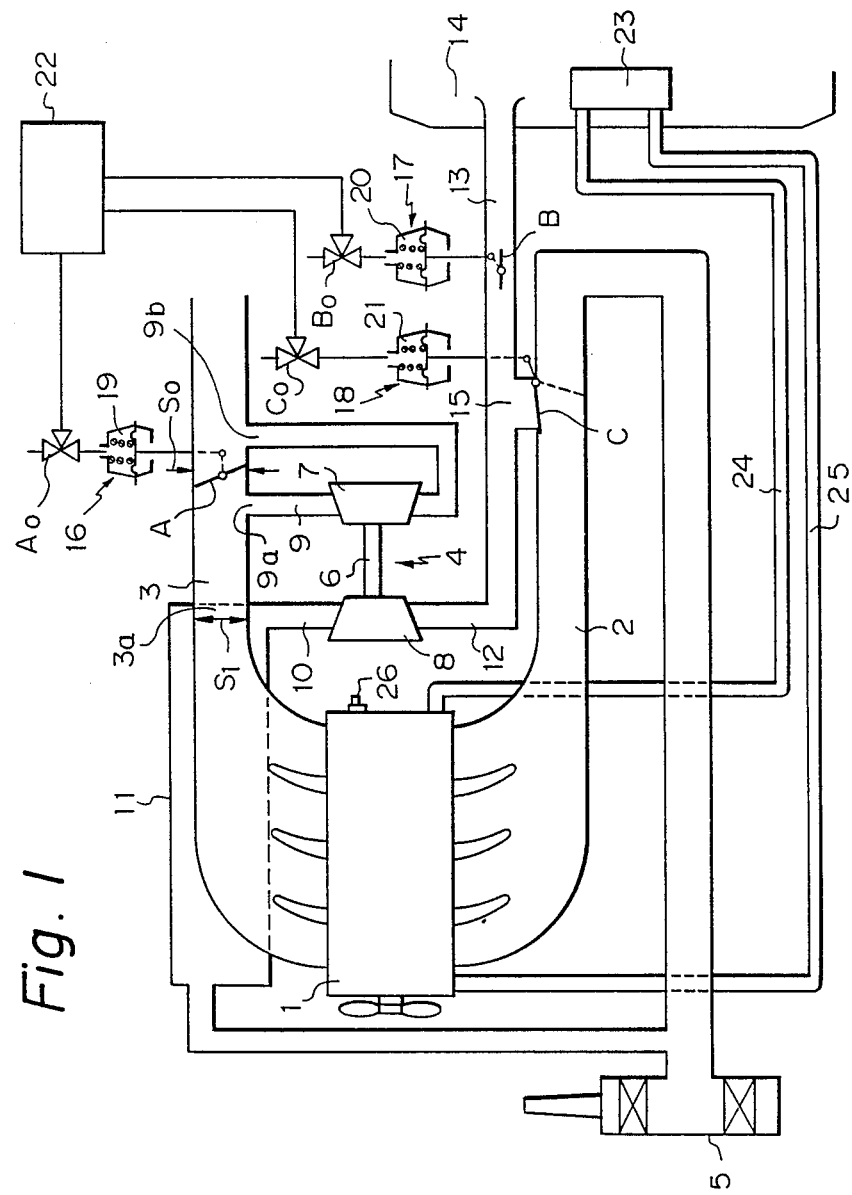
FIG. 1 is an overall view of a first embodiment of the engine warming and passenger compartment heating device.

Referring to FIG. 1, reference numeral 1 is an engine bock, 2 is an intake passage, 3 is an exhaust passage, and 4 is a turbo heater. An air cleaner 5 is mounted at the inlet portion of the intake passage 2. The turbo heater 4 includes an exhaust turbine 7 and a blower 8 mutually connected by a rotating shaft 6. A control valve A is disposed in the exhaust passage 3, and a bypass passage 9, which connects the exhaust passage 3 upstream of the control valve A and the exhaust passage 3 downstream of the control valve A, is connected to the exhaust passage 3. The exhaust turbine 7 of the turbo heater 4 is disposed in this bypass passage 9. This exhaust turbine 7 is rotated and driven by the exhaust gas flowing through the bypass passage 9. An air intake passage 10 of the blower 8 of the turbo heater 4 is connected to an air cleaner 5 through an auxiliary intake passage 11 surrounding the exhaust passage 3. The discharge passage 12 of the blower 8 is connected to the inside of a passenger compartment 14 through a hot air passage 13. The turbo heater 4 is much smaller than a turbocharger for supercharging an engine in general use, and operates most efficiently during engine idling or during a low engine speed operation. Further, the turbo heater 4 is intended to raise the air temperature, not supercharge, and therefore, uses a blower 8 having a lower supercharging efficiency than an impeller of a supercharging turbocharger. Accordingly, the rise in pressure of the air passing through the blower 8 is relatively low and the rise in temperature is considerably greater.

A control valve B is disposed inside the hot air passage 13, which is connected at a point upstream of the control valve B to the intake passage 2, through a connecting passage 15. A control valve C is disposed at the connecting portion of this connecting passage 15 and the intake passage 2, and takes either a first position in which the intake passage 2 is closed and the hot air passage 13 is communicated to the intake passage 2 downstream of the control valve C, as shown by the broken line in FIG. 1, or a second position in which the intake air passage 2 is open and shuts off the communication between the hot air passage 13 and intake passage 2, as shown by the solid line in FIG. 1. The control valves A, B, and C are connected to the respectively corresponding vacuum pressure diaphragm devices 16, 17, and 18, and the vacuum pressure chambers 19, 20, and 21 of the vacuum pressure diaphragm devices 16, 17, and 18 are connected to the vacuum pressure tank 22 respectively through solenoid changeover valves $A_0$, $B_0$, and $C_0$ communicated with the atmosphere. Under the switching action of the solenoid changeover valve $A_0$, if the vacuum pressure chamber 19 is opened to the atmosphere, the control valve A is closed, and if the vacuum pressure chamber 19 is connected to the vacuum pressure tank 22, the control valve A is fully open. In the same way, under the switching operation of the solenoid changeover valve $B_0$, if the vacuum pressure chamber 20 is opened to the atmosphere, the control valve B is closed, and if the vacuum pressure chamber 20 is connected to the vacuum pressure tank 22, the control valve B is fully open. Further, under the switching action of the solenoid changeover valve $C_0$, if the vacuum pressure chamber 21 is opened to the atmosphere, the control valve C takes the second position shown by the solid line, and if the vacuum pressure chamber 21 is connected to the vacuum pressure tank 22, the control valve C takes the first position shown by the broken line.

As shown in FIG. 1, a heater 23 utilizing engine heat is disposed inside the passenger compartment 14. Coolant water having a high temperature inside the engine body 1 is fed to the heater 23 utilizing engine heat through a coolant water supply tube 24. The coolant water discharges heat inside the passenger compartment, and thus the temperature thereof is lowered, and is returned to the engine body 1 through a coolant water return tube 25. Note, a water temperature sensor is mounted on the engine block 1 to detect the temperature of the coolant water.

Figure 2:
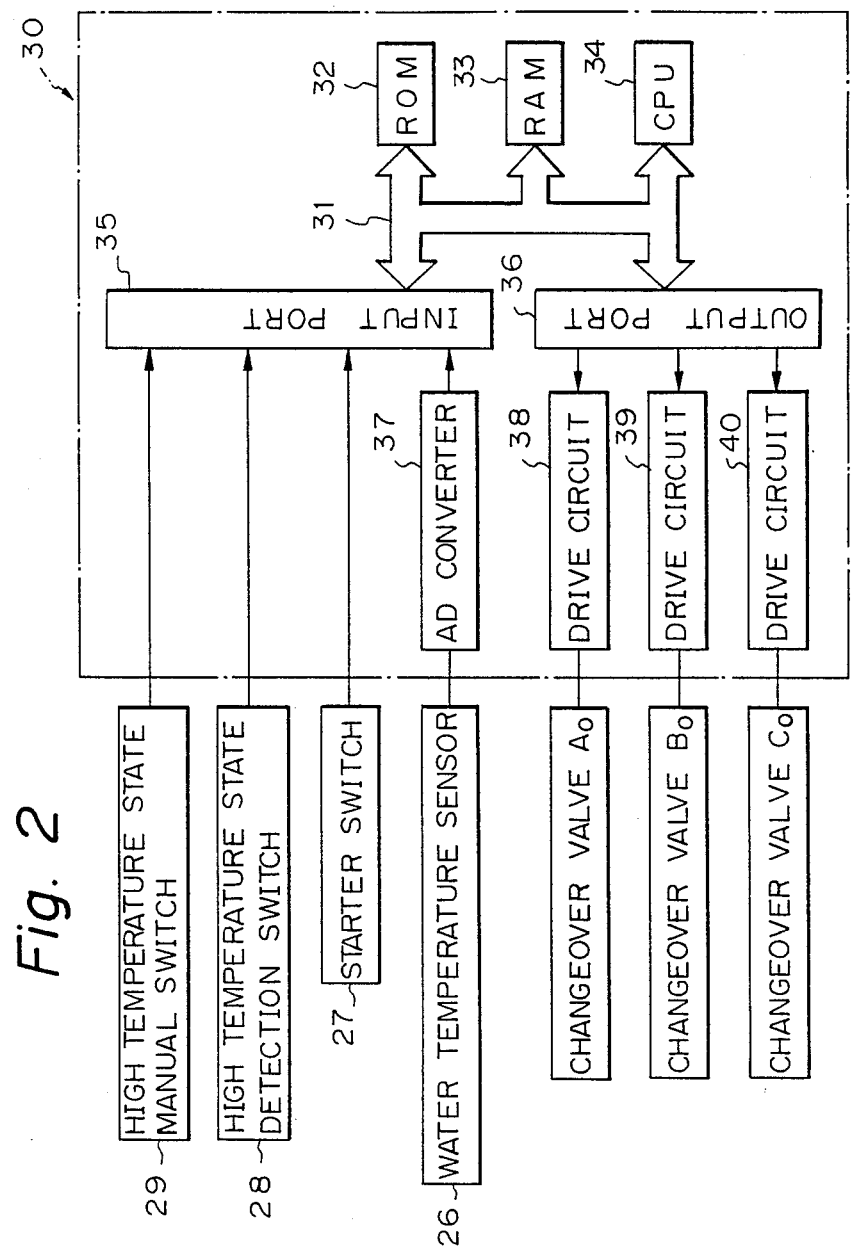
FIG. 2 is a block circuit diagram of an electronic control unit.

FIG. 2 shows an electronic control unit 30 for controlling the solenoid valves $A_0$, $B_0$, and $C_0$ Referring to FIG. 2, the electronic control unit 30 is constructed as a digital computer and is equipped with a ROM (read only memory) 32, RAM (random access memory) 33, CPU (microprocessor) 34, input port 35, and output port 36, interconnected by a bidirectional bus 31. The input port 35 is connected to a starter switch 27 for driving a starter motor, and further, is connected to water temperature sensor 26 through an AD converter 37. Furthermore, the input port 35 is connected to a high temperature detection switch 28 for determining the outside air temperature and a manual switch 29 operated when the outside air has a high temperature. The high temperature detection switch 28 operates in accordance with the outside air temperature, i.e., turns on when the outside air temperature is higher than a predetermined temperature setting, e.g., when the outside air temperature is high in the summer. The high temperature manual switch 29 is turned on manually by the driver when the outside air temperature is high. When the outside air temperature is high, the two switches 28 and 29 are turned on, and thus in practice, it is sufficient to provide only one of the switches 28 and 29. The output port 36 is connected to the solenoid changeover valves $A_0$, $B_0$, and $C_0$ through the corresponding drive circuits 38, 39 and 40.

Next, an explanation will be made of the engine warming and passenger compartment heating control, with reference to the flow chart shown in FIG. 3.

Figure 3:
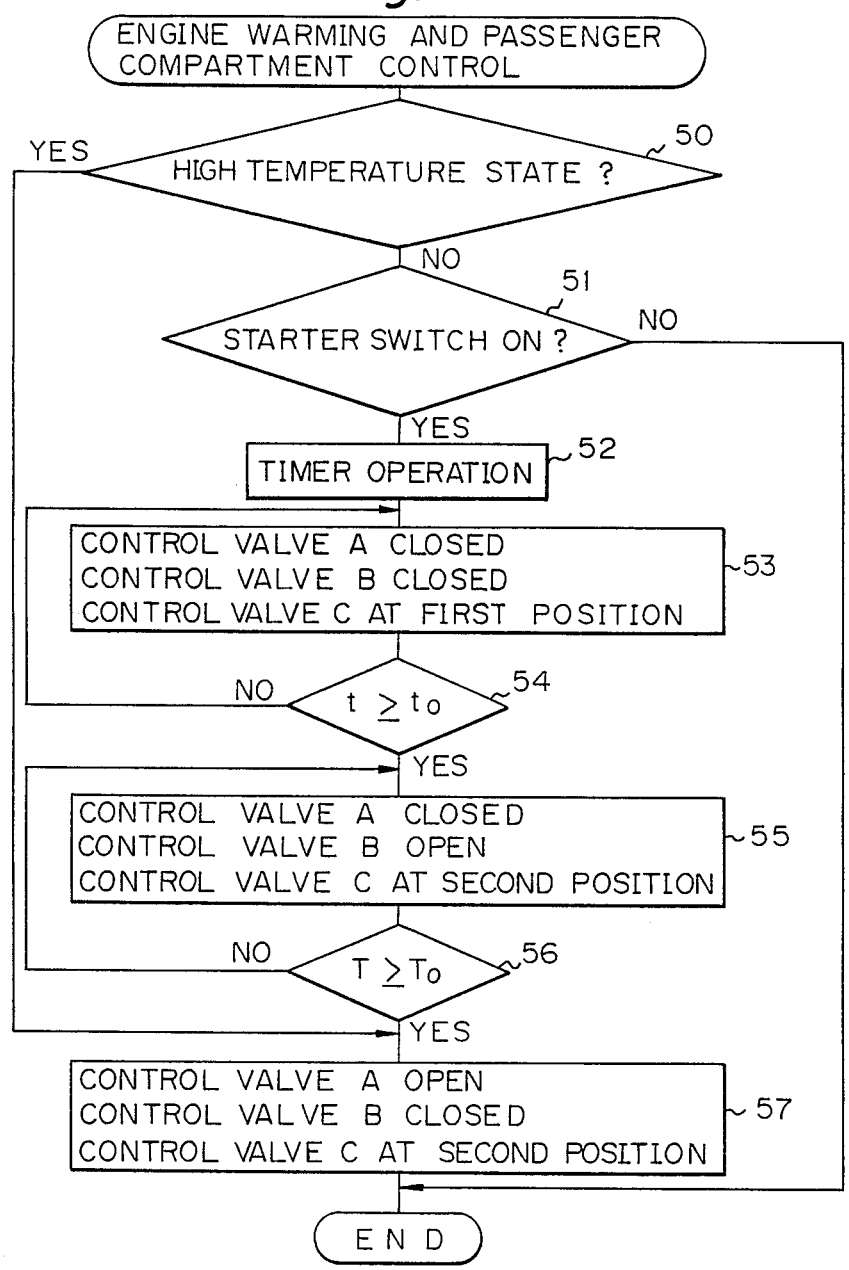
FIG. 3 is a flow chart for executing the engine warming and passenger compartment heating control.

Referring to FIG. 3, first, at step 50, it is determined from the signal output by the high temperature state detection switch 28 or the high temperature manual switch 29 whether or not the outside air temperature is higher than the predetermined temperature setting. When the outside air temperature is lower than the predetermined temperature setting, the control advances to step 51 and it is determined whether or not the starter switch 27 is on. If the starter switch 27 is on, the control advances to step 52 and a timer is actuated. Next, at step 53, control signals are sent to solenoid changeover valves $A_0$, $B_0$, and $C_0$ to close the control valve A and the control valve B and to turn the control valve C to the first position shown by the broken line in FIG. 1. Then, at step 54, based on the timer, it is determined whether or not the elapsed time t from when the starter switch 27 is turned on has exceeded a predetermined time setting $t_0$. If $t < t_0$, the control returns to step 53 and the control valves A and B are held in the closed state and the control valve C is held in the first position for a predetermined time after the engine startup.

Accordingly when the starter switch 27 is turned on, the control valve A is closed, and thus all gas discharged from the engine is fed into the bypass passage 9, and as a result, immediately after the engine is rotated by the starter motor, the turbo heater 4 is rotated and driven. When the turbo heater 4 begins to rotate, high temperature gas from the blower 8 is immediately exhausted to the discharge passage 12 of the blower 8. At this time, the control valve B is closed and the control valve C is at the first position shown by the broken line in FIG. 1, and thus the high temperature air discharged from the blower 8 is supplied to the engine cylinders through the connecting passage 15 and the intake passage 2. Therefore, immediately after the engine begins to rotate, high temperature air is supplied to the engine cylinders, and thus the engine speed immediately rises and a quick warm up of the engine is obtained. When the engine is started, the air inside the secondary intake passage 11 is gradually heated by the exhaust gas, and therefore, the temperature of the air fed into the engine cylinders gradually rises.

At step 54 in FIG. 3, it is determined whether $t < t_0$, and the control advances to step 55, whereat the control valve A is held in the closed state, the control valve B is closed, and the control valve C is turned to the second position shown by the solid line in FIG. 1, and therefore, the high temperature air discharged from the blower 8 is fed into the passenger compartment 14 through the hot air passage 13. At this time, the coolant water temperature is still low, and therefore almost no heat is emitted by the heater 23 utilizing engine heat, and thus the passenger compartment 14 is heated by the high temperature air supplied from the hot air passage 13 to the passenger compartment 14. Accordingly, the passenger compartment 14 is rapidly heated after the engine startup. In step 56 of FIG. 4, it is determined from the signal output by the water temperature sensor 26 whether or not the coolant water temperature T is higher than a predetermined temperature setting $T_0$, and if $T_0 > T$, the control returns to step 55.

Next, when $T \geq T_0$, the control advances to step 57, whereby the control valve A is opened, the control valve B is closed, and the control valve C is held at the second position. When the control valve A is open, exhaust gas is not supplied to the bypass passage 9, and further, the discharge passage 12 is closed by the control valves B and C, so that the turbo heater 4 is stopped. When the coolant water temperature T is higher than a temperature setting $T_0$, the passenger compartment 14 can be heated by the heater 23 utilizing engine heat, and thus the supply of high temperature air from the hot air passage 13 is stopped as mentioned above.

At step 50, if it is determined that the outside air temperature is higher than a predetermined temperature setting, the control jumps to step 57, whereat the control valve A is opened, the control valve B is closed, and the control valve C is held at the second position. Therefore, as mentioned above, exhaust gas is not supplied to the bypass passage 9, and further, the discharge passage 12 is closed by the control valves B and C, so that the turbo heater 4 is completely stopped. That is, in the summer, when the engine is started, the turbo heater 4 will not operate, and therefore, hot air will not be supplied to the intake passage 2 or the hot air passage 13.

When the turbo heater is operated the exhaust passage is throttled, and as a result, the pressure rises and thus the fuel consumption rate is lowered. Further, in the summer, use is made of air conditioners, and thus the fuel consumption rate is further lowered. Nevertheless, as mentioned above, when hot air is not needed, the discharge passage of the turbo heater is shut and the operation of the turbo heater completely stopped, and thus a further lowering of the fuel consumption rate is prevented.

Further, when the control valve A is fully opened, if the exhaust gas continues to flow through the bypass passage 9, the rotation of the turbo heater 4 cannot be stopped, and this has an adverse effect on the durability of the turbo heater 4. Therefore, in the embodiment shown in FIG. 1, the sectional area $S_0$ of the exhaust passage 3 around the control valve A is made larger than or equal to the sectional area $S_1$ of the manifold cluster portion 3a upstream of the control valve A. Accordingly, the area around the control valve A during the fully opened state of the control valve A will not act as a throttle, and therefore, no pressure difference will occur upstream and downstream of the control valve A, and thus the inflow of exhaust gas to the bypass passage 9 is prevented. Further, if the outlet opening 9b of the bypass passage 9 is located far from the control valve A on the downstream side, a drop in pressure in the exhaust passage 3 will cause a pressure difference at the inlet opening 9a and the outlet opening 9b of the bypass passage 9, and therefore, exhaust gas will flow in the bypass passage 9. Therefore, to ensure that exhaust gas does not flow in the bypass passage 9 immediately the control valve A is fully opened, preferably the inlet opening 9a and the outlet opening 9b of the bypass passage 4 are positioned as close to the control valve A as possible.

In the embodiment shown in FIGS. 1 to 3, if the coolant water temperature T becomes higher than the temperature setting $T_0$, i.e., if the engine warmup is completed, the operation of the turbo heater 4 is stopped. But, when the exhaust pressure is low even after the completion of the engine warmup, for example, during a low engine speed operation or vehicle start, if the turbo heater 4 is operated and high temperature pressurized air is supplied to the engine cylinders, atomization and evaporation of the injected fuel are promoted and an excellent combustion without ignition delays can be obtained. Nevertheless, the inherent function of the turbo heater 4 is to provide an easy engine warmup when the engine speed is low, and therefore, when the engine speed is low, the turbo heater must display a maximum capability. Therefore, if the turbo heater 4 is operated at all times even after the completion of the engine warmup, the turbo heater 4 will break down.

FIGS. 4 to 15 show various embodiments enabling an excellent combustion without ignition delays by operating the turbo heater within a range at which damage will not occur after a completion of the engine warmup. These embodiments will be now explained.

Figure 4:
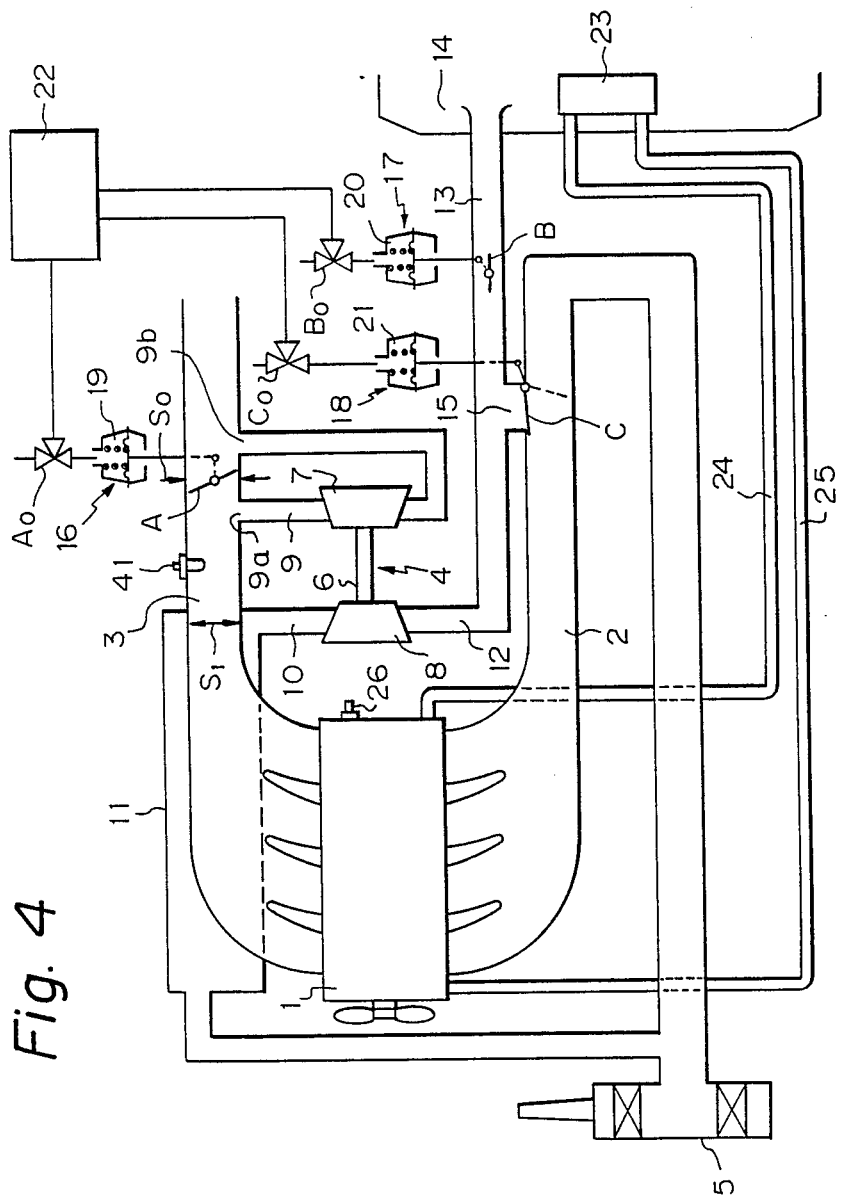
FIG. 4 is a overall view of a second embodiment of the engine warming and passenger compartment heating device.
Figure 5:
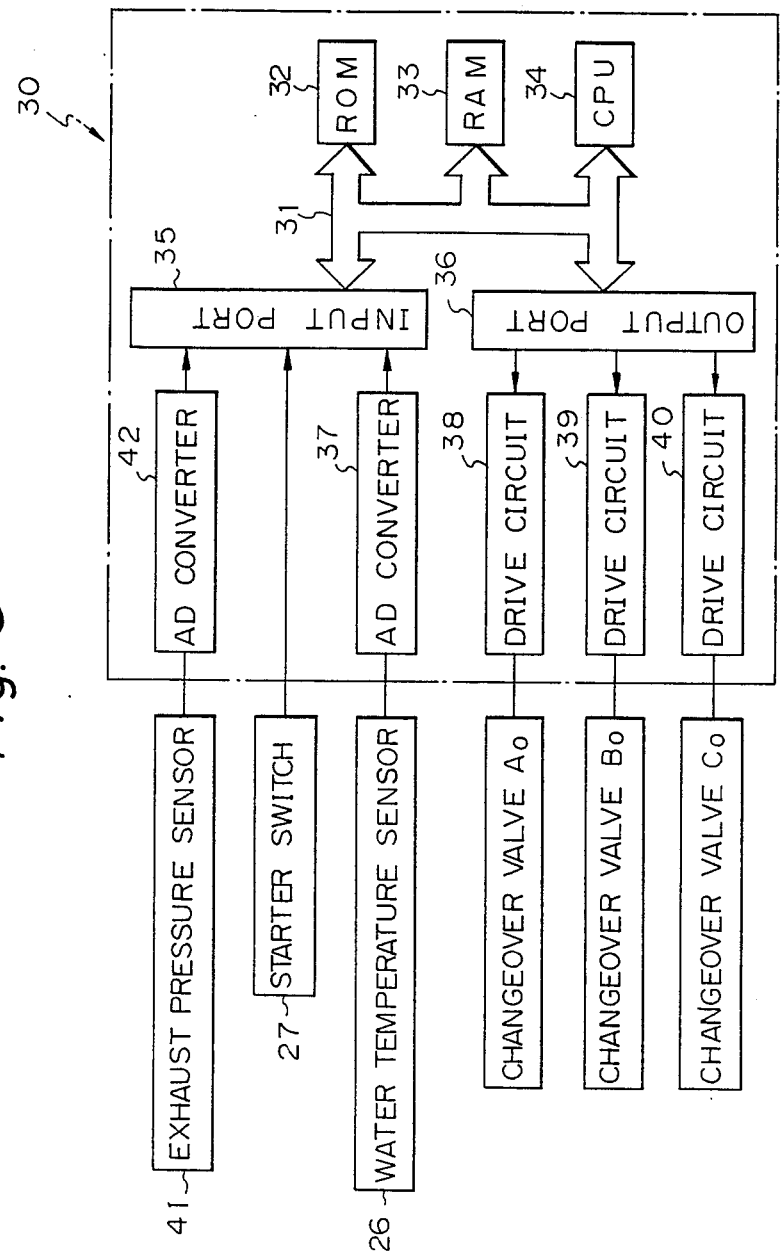
FIG. 5 is a block circuit diagram of an electronic control unit.

FIGS. 4 to 7 show a second embodiment of the invention. In this embodiment, as shown in FIG. 4, an exhaust pressure sensor 41 is disposed in the exhaust passage 3 upstream of the control valve A, and as shown in FIG. 5, the exhaust pressure sensor 41 is connected to the input port 35 through the AD converter 42. Note that, in FIG. 4 and FIG. 5, constituent requirements the same as shown in FIG. 1 and FIG. 2 are shown by the same symbols and numerals, and explanations thereof are omitted. The same applies to the embodiments shown in FIG. 8, FIG. 9, FIG. 12, and FIG. 13.

Figure 6:
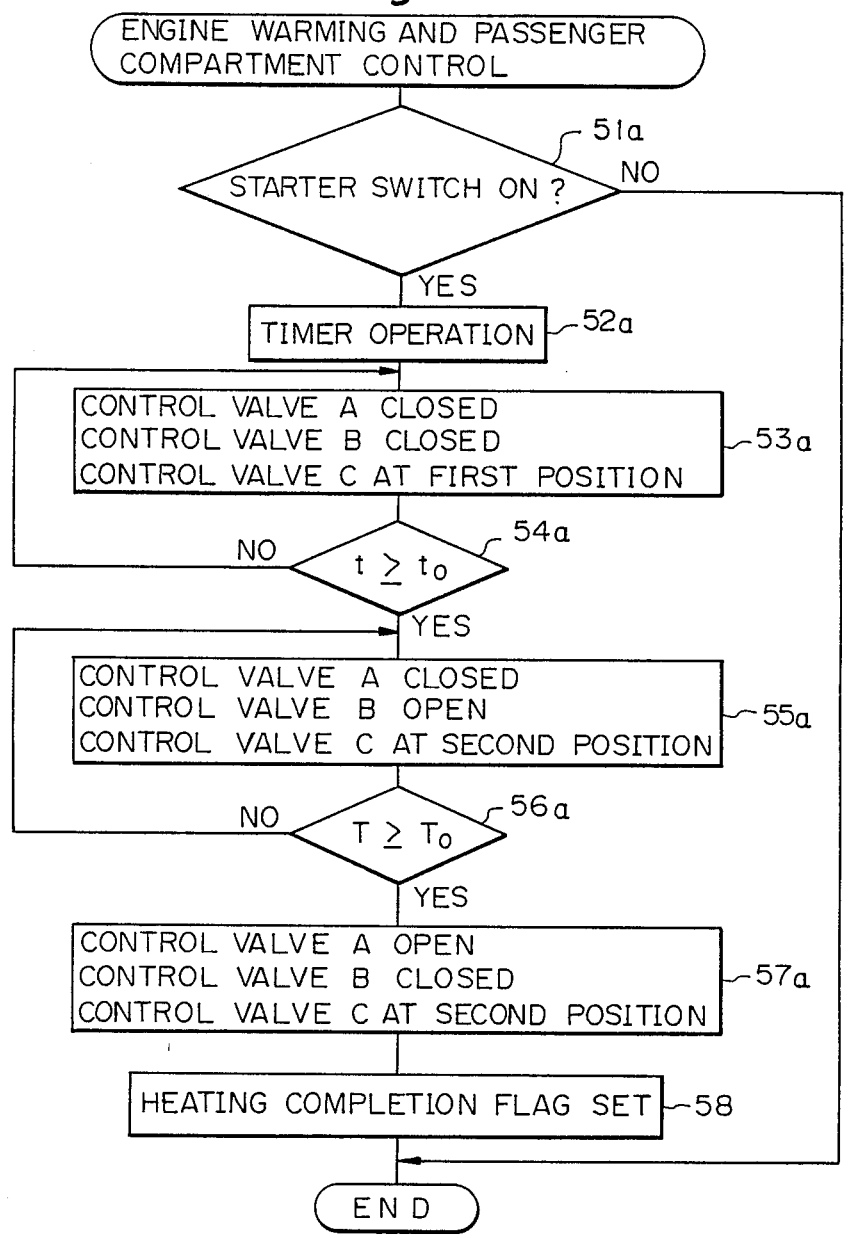
FIG. 6 is a flow chart for executing the engine warming and passenger compartment heating control.
Figure 7:
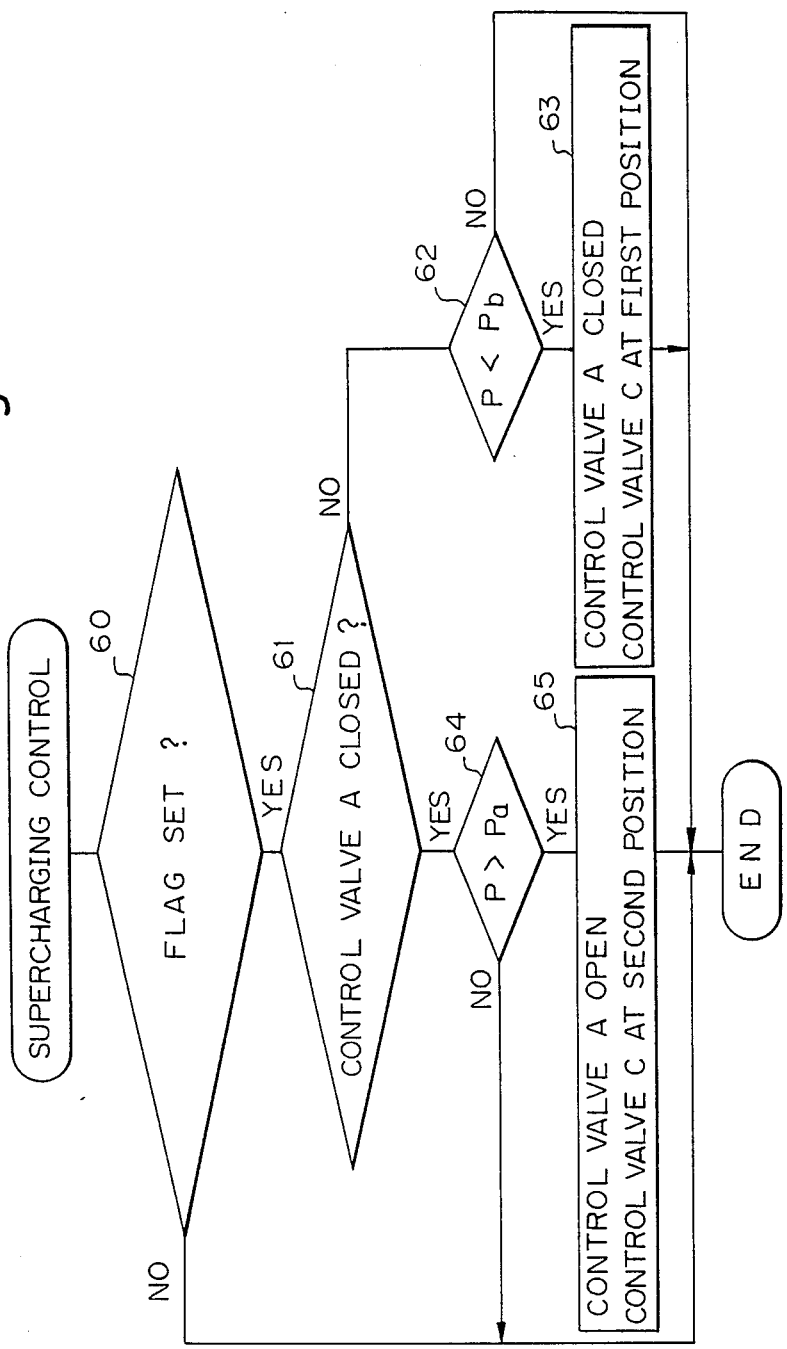
FIG. 7 is a flow chart for executing the supercharging control.

Next, an explanation will be given of the engine warming and passenger compartment heating control with reference to the flow chart shown in FIG. 6 and FIG. 7. FIG. 6 shows the engine warming and passenger compartment heating control performed from the engine startup to when the engine warmup is completed, and FIG. 7 shows the supercharging control performed after the engine warmup is completed. Therefore, first an explanation will be made of the engine warming and passenger compartment heating shown in FIG. 6.

Steps 51a to 57a of FIG. 6 respectively correspond to steps 51 to 57 of FIG. 3. That is, referring to FIG. 6, first, at step 51a, it is determined whether or not the starter switch 27 is on. If the starter switch 27 is on, the control advances to step 52a and the timer is actuated. Next, in step 53a, control signals are sent to the solenoid changeover valves $A_0$, $B_0$, and $C_0$, whereby the control valve A and the control valve B are closed and the control valve C is turned to the first position shown by the broken line in FIG. 4. Next, at step 54a, it is determined from the timer if the elapsed time t from when the starter switch 27 was turned on exceeds a predetermined time setting $t_0$. If $t < t_0$, the control again returns to step 53a. Therefore, for a predetermined period after the startup of the engine, the control valves A and B are held in the closed state and the control valve C is held in the first position.

Accordingly, if the starter switch 27 is turned on, the control valve A is closed, and thus all gas exhausted from the engine is fed to the bypass passage 9. As a result, if the engine is rotated by the starter motor, the turbo heater 4 is immediately rotated and driven. When the turbo heater 4 begins to rotate, high temperature air from the blower 8 is immediately exhausted to the discharge passage 12 of the blower 8. The control valve B is closed and the control valve C is at the first position shown by the broken line in FIG. 4, so that the high temperature air discharged from the blower 8 is supplied to the engine cylinders through the connecting passage 15 and the intake passage 2. Accordingly, when the engine begins to rotate the high temperature air is immediately supplied to the engine cylinders, so that the engine speed immediately rises and quick engine warmup is obtained. When the engine is started, the air inside the auxiliary intake passage 11 is gradually heated by the exhaust gas, and therefore, the temperature of the air supplied in the engine cylinders gradually rises.

In step 54a of FIG. 6, it is determined whether $t > t_0$, if so, the control advances to step 55a and the control valve A is held in the closed state, the control valve B is opened, and the control valve C is turned to the second position shown by the solid line in FIG. 4. Therefore, the high temperature air discharged from the blower 8 is fed to the passenger compartment 14 through the hot air passage 13. The engine coolant water temperature is still low, and thus almost no heat is emitted by the heater 23 utilizing engine heat, and therefore, the passenger compartment 14 is heated by high temperature air supplied from the hot air passage 13, and therefore, it is determined from the signal output by the water temperature sensor 26 whether the coolant water temperature T is higher than the predetermined temperature setting $T_0$. If $T_0 > T$, the control returns to step 55a.

Next, if $T > T_0$, the control advances to step 57a, whereby the control valve A is opened, the control valve B is closed, and the control valve C is held at the second position. When the control valve A is opened, the supply of exhaust gas inside the bypass passage 9 is stopped, and further, the discharge passage 12 is closed by the control valves B and C, so that the turbo heater 4 is stopped. If the cooling water temperature T becomes higher than the temperature setting $T_0$, the passenger compartment 14 is sufficiently heated by the heater 23 utilizing engine heat, and thus the supply of high temperature air from the hot air passage 13 is stopped as mentioned above.

Next, at step 58, the passenger compartment heating completion flag is set and the processing cycle is completed.

Next, an explanation will be made of the supercharging control shown in FIG. 7. The routine shown in FIG. 7 is performed by interruptions at predetermined intervals.

Referring to FIG. 7 at step 60, it is determined whether or not the heating completion flag is set, i.e., whether the heating of the passenger compartment 14 by the turbo heater 4 is completed. When the heating completion flag is set, the control advances to step 61 and it is determined whether or not the control valve A is closed. When the control valve A is open, the control advances to step 62 and it is determined whether the exhaust pressure P detected by the exhaust pressure sensor 27 is lower than a predetermined value Pb. When $P \geq Pb$, the processing routine is completed, and therefore, the control valve A is held in the open state. When $P < Pb$, the control advances to step 63, the control valve A is closed, and the control valve C is turned to the first position shown by the broken line in FIG. 4. Note that the control valve B remains closed and therefore, the turbo heater 4 is rotated and driven and the high temperature pressurized air discharged from the blower 8 is sent to the engine cylinders. If the control valve A is opened, the control advances from step 61 to step 64 and it is determined whether the exhaust pressure P is higher than a predetermined value Pa (Pa > Pb). If $P \leq Pa$, the control valve A remains closed, and therefore, the high temperature pressurized air discharged from the blower 8 is supplied to the engine cylinders. When $P > Pa$, i.e., when the exhaust pressure P is higher, the control advances to step 65, the control valve A is opened, and the control valve C is turned to the second position shown by the solid line in FIG. 4, and therefore, the turbo heater 4 is stopped and high temperature pressurized air is not supplied to the engine cylinders.

In this second embodiment, when the exhaust pressure P is lower than a value Pb, the high temperature pressurized air is supplied inside the engine cylinders, and when the exhaust pressure P is higher than a value Pa, the supply of the high temperature pressurized air to the engine cylinders is stopped. Namely, high temperature pressurized air is supplied inside the engine cylinders only when the exhaust pressure is low. Accordingly, when the exhaust pressure is low after the completion of heating, for example, during a low engine speed operation or vehicle start, high temperature pressurized air is supplied to the engine cylinders, and thus atomization and vaporization of the injected fuel are promoted and an excellent combustion without ignition delays is achieved, resulting in an improved output torque and lower combustion noise.

When the exhaust pressure is higher and the control valve A is closed, the exhaust passage 3 is throttled so that the exhaust pressure becomes higher, the fuel consumption rate is lowered, and further, the capacity of the turbo heater 4 is exceeded, and thus there is a danger of damage to the turbo heater 4. Therefore in the second embodiment, before the capacity of the turbo heater 4 is exceeded, the control valve A is opened to prevent damage to the turbo heater 4, and simultaneously, to prevent a lowering of the fuel consumption rate.

Note that other parameters enabling a judgement of whether or not the turbo heater 4 capacity has been exceeded are a rise in pressure inside the intake passage 2 and the engine speed. Therefore, the supercharging control shown in FIG. 7 can be based on the pressure in the intake passage 2 or on the engine speed.

FIGS. 8 to 11 show a third embodiment for executing the supercharging control based on the pressure in the intake passage 2.

Figure 8:
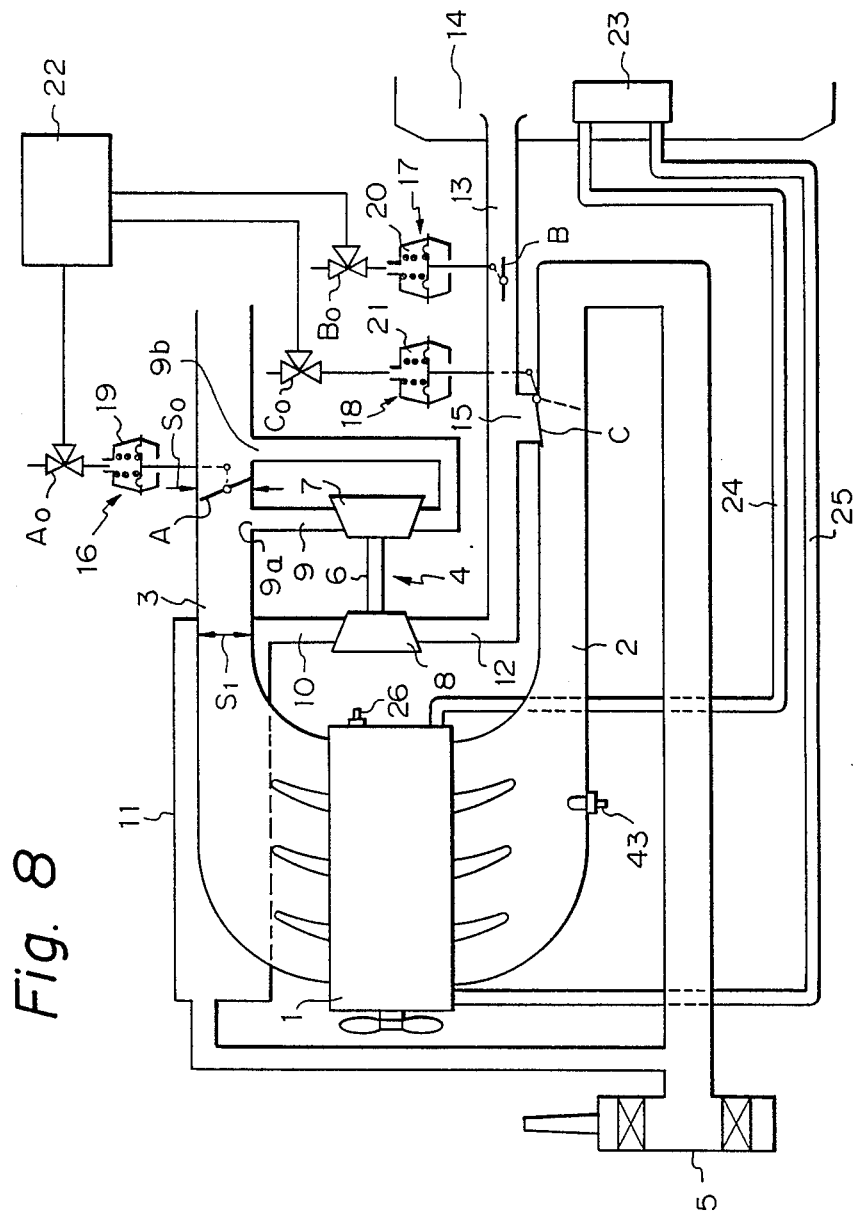
FIG. 8 is an overall view of a third embodiment of a engine warming and passenger compartment heating device.
Figure 9:
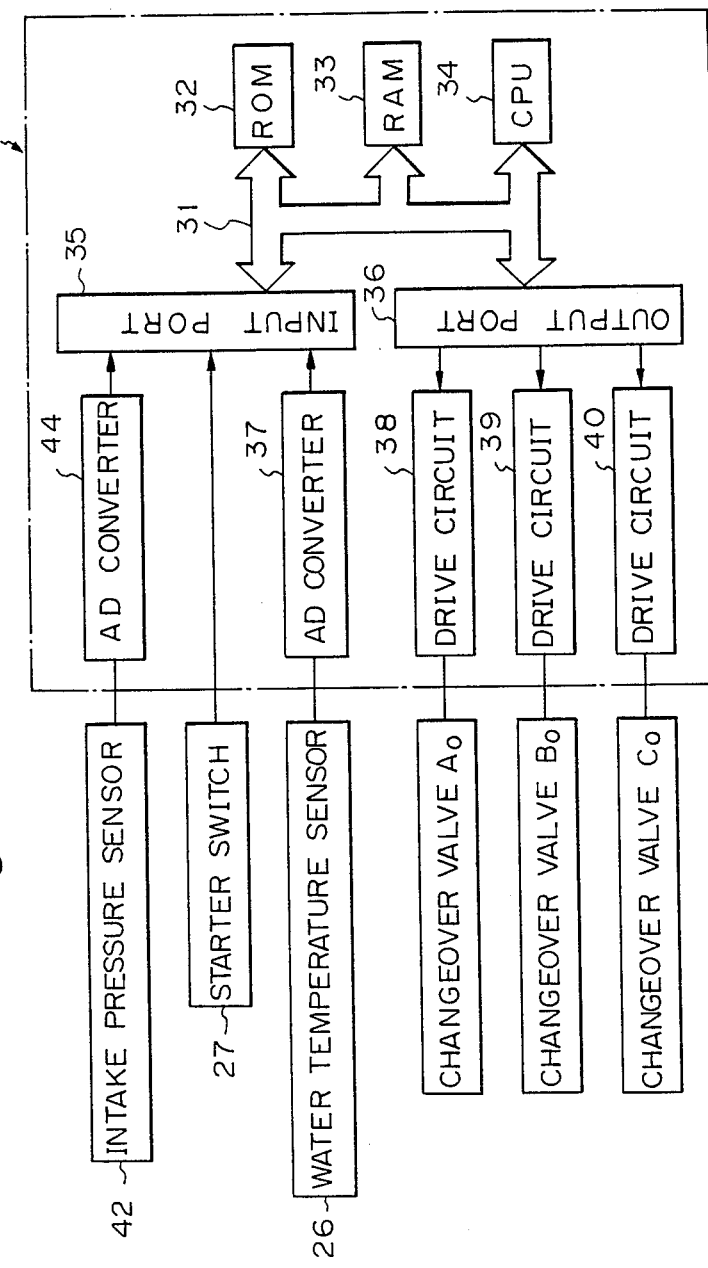
FIG. 9 is a block circuit diagram of an electronic control unit.

In this embodiment, as shown in FIG. 8, an intake pressure sensor 43 is disposed inside the intake passage 2, and as shown in FIG. 9, this intake pressure sensor 43 is connected to the input port 35 through the AC converter 44.

Figure 10:
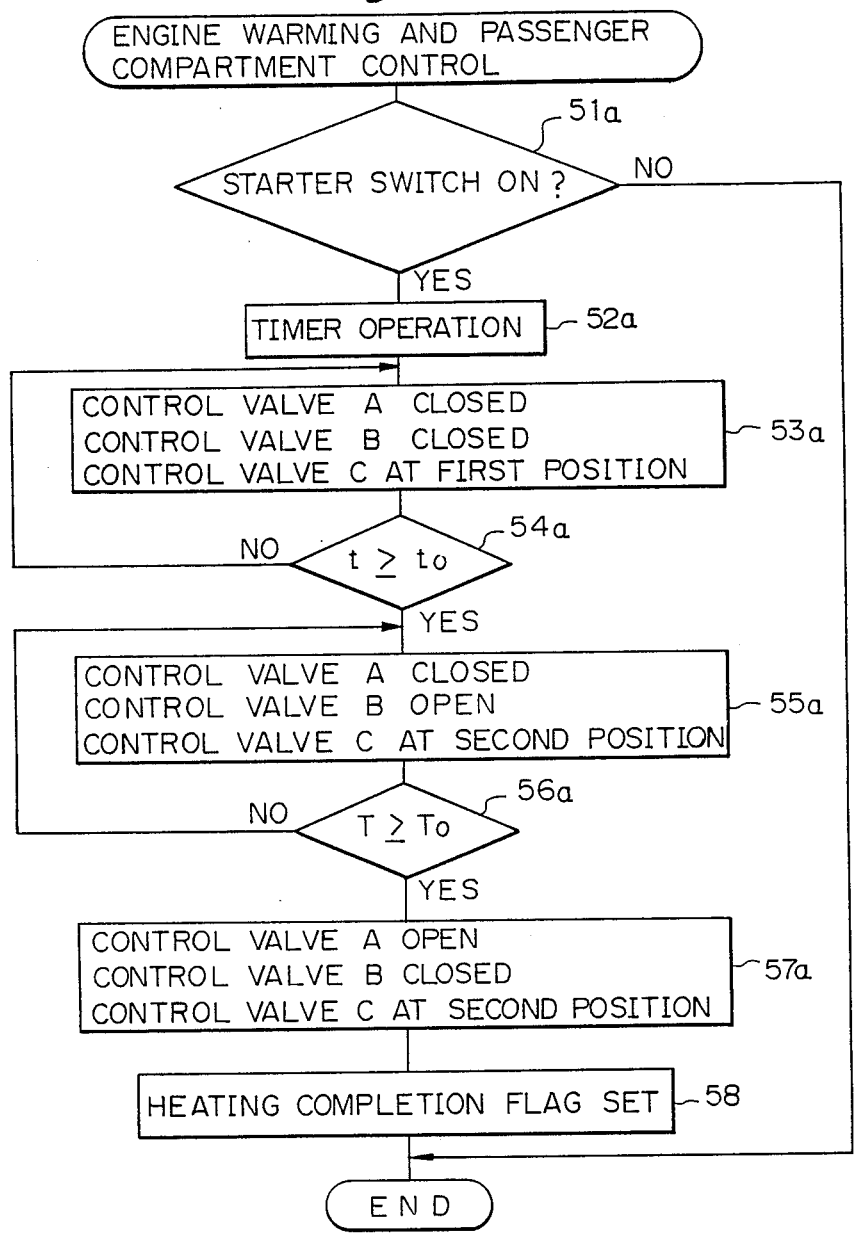
FIG. 10 is a flow chart for executing the engine warming and passenger compartment heating control.

The engine warming and passenger compartment heating control shown in FIG. 10 is the same as the engine warming and passenger compartment heating control shown in FIG. 6, and thus an explanation thereof is omitted.

Next, an explanation will be made of the supercharging control shown in FIG. 11. Note that the routine shown in FIG. 11 is performed by interruptions at predetermined intervals.

Figure 11:
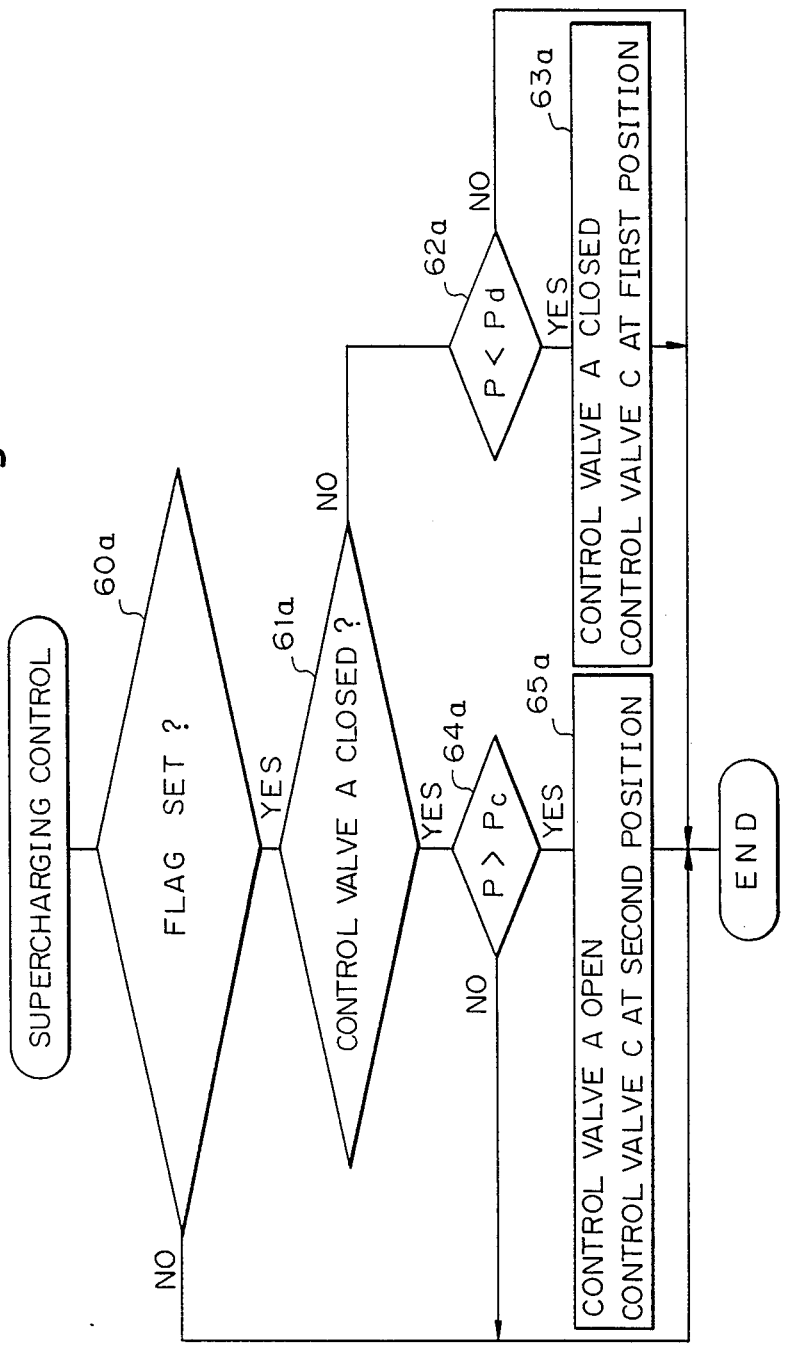
FIG. 11 is a flow chart for executing the supercharging control.

Referring to FIG. 11, at step 60a, it is determined whether or not the heating completion flag is set, i.e., if the heating of the passenger compartment 14 by the turbo heater 4 is completed. When the heating completion flag is set, the control advances to step 61a and it is determined whether or not the control valve A is closed. When the control valve A is open, the control advances to step 62a and it is determined whether the intake pressure P detected by the intake pressure sensor 43 is lower than a predetermined value Pd. When $P \geq Pd$, the processing routine is completed, and therefore, the control valve A is held in the open state. When $P < Pd$, the control advances to step 63a, the control valve A is closed, and the control valve C is turned to the first position shown by the broken line in FIG. 8. Note that the control valve B remains closed, and therefore, the turbo heater 4 is rotated and driven and the high temperature pressurized air discharged from the blower 8 is sent to the engine cylinders. If the control valve A is open, the control advances from step 61a to step 64a and it is determined whether the intake pressure P is higher than a predetermined value P=c (Pc>Pd). If P≦Pc, the control valve A remains closed, and therefore, the high temperature pressurized air discharged from the blower 8 is supplied to the engine cylinders. When P>Pc, i.e., when the intake pressure P rises, the control advances to step 65a, the control valve A is opened, and the control valve C is turned to the second position shown by the solid line in FIG. 8. Therefore, the turbo heater 4 is stopped and high temperature pressurized air is not supplied in the engine cylinders.

Accordingly, in this third embodiment, when the intake pressure P is lower than a value Pd, the high temperature pressurized air is supplied in the engine cylinders, and when the intake pressure P is higher than a value Pc, the supply of the high temperature pressurized air to the engine cylinders is stopped. Namely, high temperature pressurized air is supplied in the engine cylinders only when the intake pressure is low, and accordingly, when the intake pressure is low after the completion of heating, for example, during a low engine speed operation or vehicle start, high temperature pressurized air is supplied in the engine cylinders, and thus atomization and vaporization of the injected fuel are promoted and an excellent combustion without ignition delays is achieved, resulting in an improved output torque and a lower combustion noise.

When the intake pressure is higher and the control valve A is closed, the capacity of the turbo heater 4 is exceeded and there is a danger of damage to the turbo heater 4. Therefore, in the third embodiment, before the capacity of the turbo heater 4 is exceeded, the control valve A is opened to prevent damage to the turbo heater 4.

FIGS. 12 to 15 show a fourth embodiment for executing a supercharging control based on the engine speed.

Figure 12:
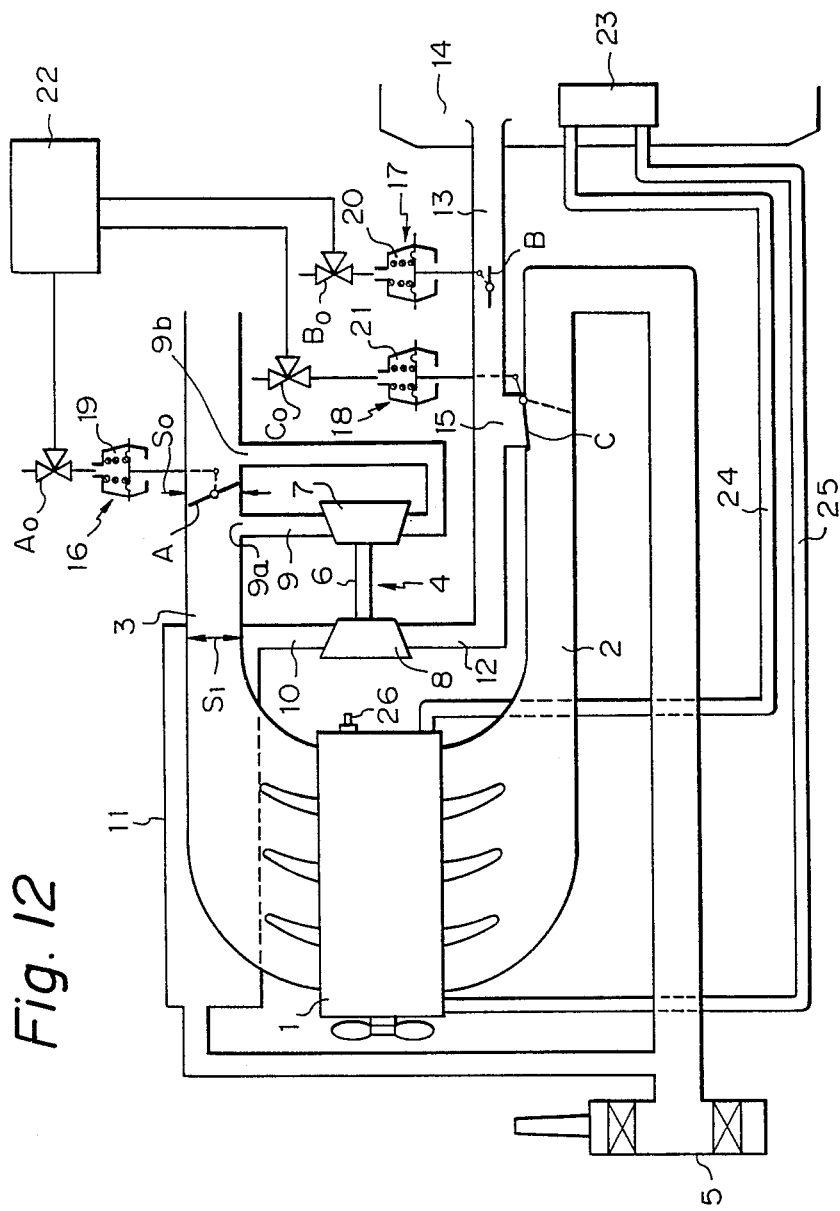
FIG. 12 is an overall view of a fourth embodiment of a engine warming and passenger compartment heating device.
Figure 13:
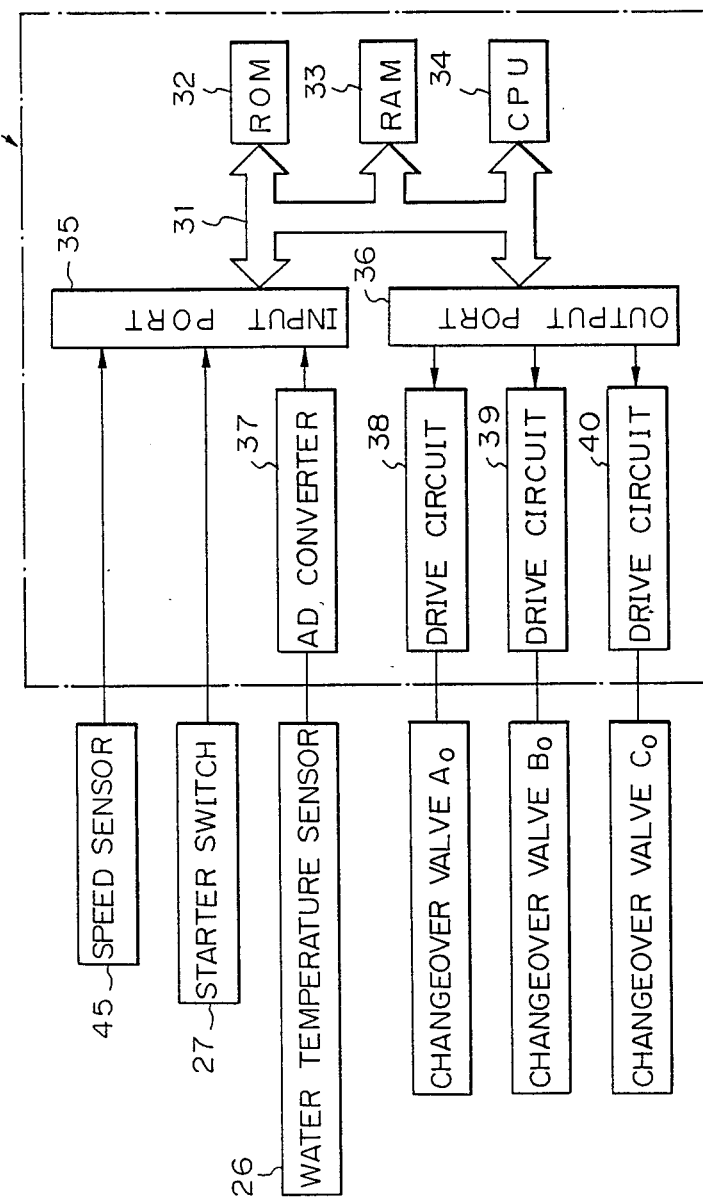
FIG. 13 is a block circuit diagram of an electronic control unit.

The structure shown in FIG. 12 is the same as the structure shown in FIG. 1, but in this embodiment, as shown in FIG. 13, a speed sensor 45 is connected to the input port 35.

Figure 14:
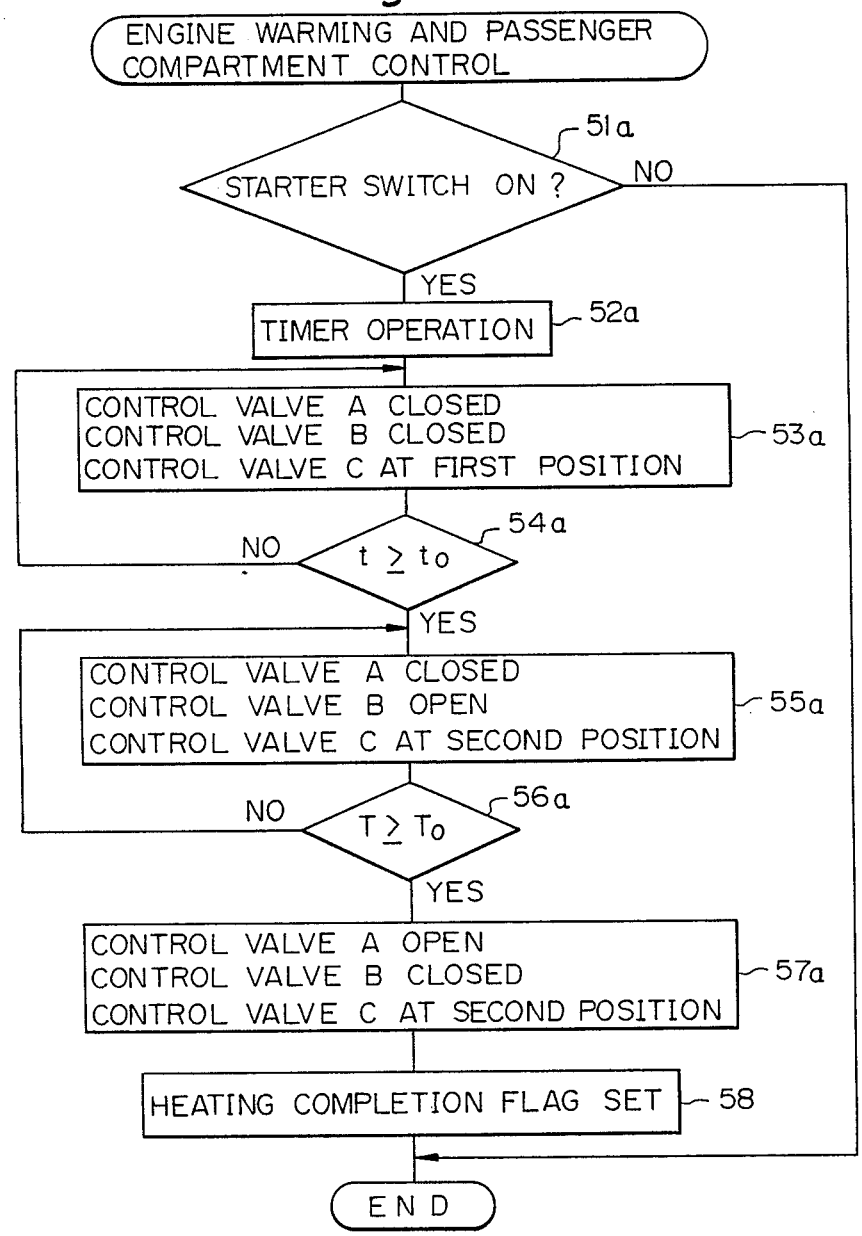
FIG. 14 is a flow chart for executing the engine warming and passenger compartment heating control.

The engine warming and passenger compartment heating control shown in FIG. 14 is the same as the engine warming and passenger compartment heating control shown in FIG. 6, and thus an explanation thereof is omitted.

Next, an explanation will be made of the supercharging control shown in FIG. 15. Note that the routine shown in FIG. 15 is performed by interruptions at predetermined intervals.

Figure 15:
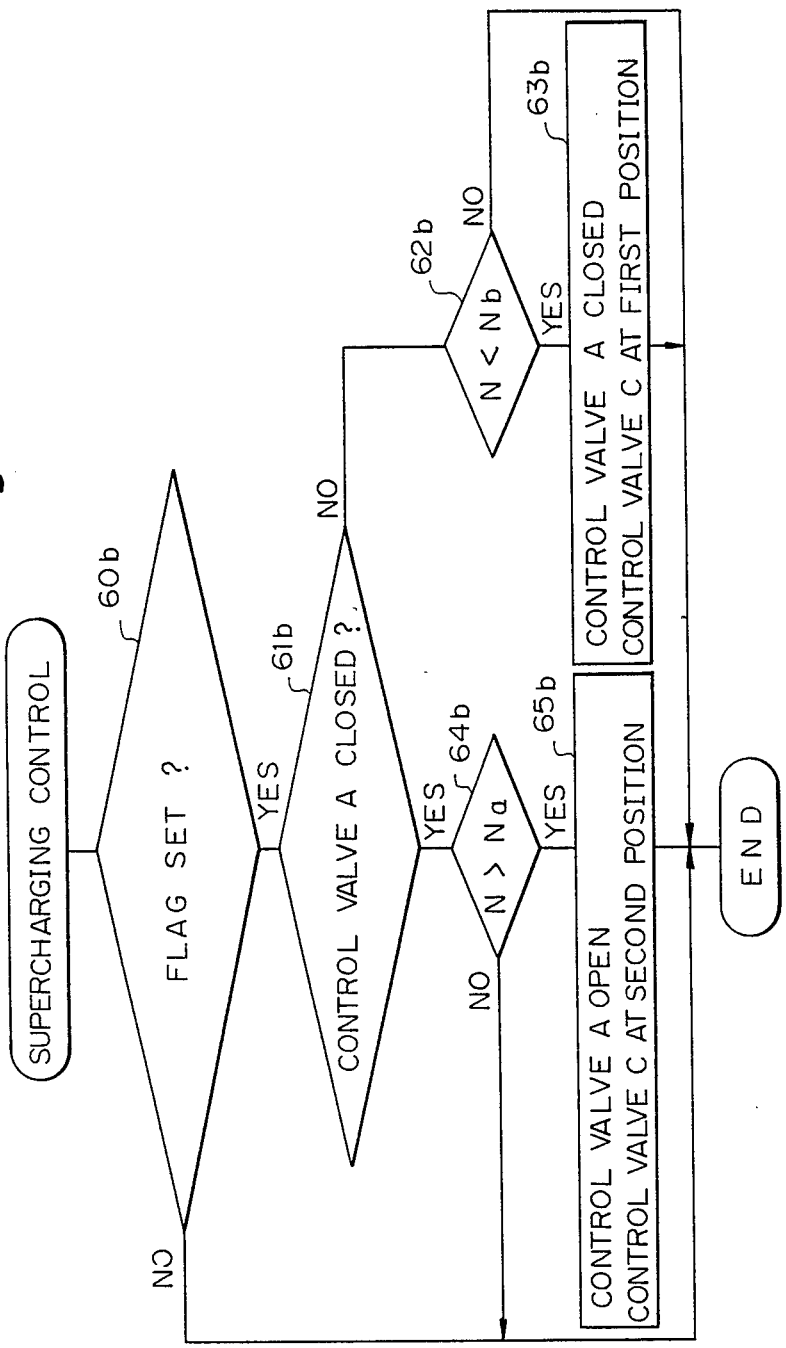
FIG. 15 is a flow chart for executing the supercharging control.

Referring to FIG. 15, at step 60b, it is determined whether or not the heating completion flag is set, i.e., whether the heating of the passenger compartment 14 by the turbo heater 4 is completed. When the heating completion flag is set, the control advances to step 61b and it is determined whether or not the control valve A is closed. When the control valve A is open, the control advances to step 62b and it is determined whether the engine speed N detected by the speed sensor 45 is lower than a predetermined value Nb. When N≧Nb, the processing routine is completed, and therefore, the control valve A is held in the open state. When N<Nb, the control advances to step 63b, the control valve A is closed, and the control valve C is turned on the first position shown by the broken line in FIG. 12. Note that the control valve B remains closed, and therefore, the turbo heater 4 is rotated and driven and the high temperature pressurized air discharged from the blower 8 is sent to the engine cylinders. If the control valve A is opened, the control advances from step 61b to step 64b and it is determined whether the engine speed N is higher than a predetermined value Na (Na>Nb). If N≦Na, the control valve A remains closed, and therefore, the high temperature pressurized air discharged from the blower 8 is supplied to the engine cylinders. When N>Na, i.e., when the engine speed N rises, the control advances to step 65b, the control valve A is opened, and the control valve C turns to the second position shown by the solid line in FIG. 12. Therefore, the turbo heater 4 is stopped and high temperature pressurized air is not supplied to the engine cylinders.

Accordingly, in this fourth embodiment, when the engine speed N is lower than a value Nb, the high temperature pressurized air is supplied to the engine cylinders, and when the engine speed N is higher than a value Na, the supply of the high temperature pressurized air to the engine cylinders is stopped. Namely, high temperature pressurized air is supplied to the engine cylinders only when the engine speed is low, and accordingly, when the engine speed is low after the completion of heating, for example, during a low engine speed operation or vehicle start, high temperature pressurized air is supplied to the engine cylinders, and thus atomization and vaporization of the injected fuel are promoted and an excellent combustion without ignition delays is achieved, resulting in an improved output torque and lower combustion noise.

When the engine speed becomes higher and the control valve A is closed, the exhaust pressure becomes higher, the fuel consumption rate is lowered, and the capacity of the turbo heater 4 is exceeded, and thus there is a danger of damage to the turbo heater 4. Therefore, in the fourth embodiment, before the capacity of the turbo heater 4 is exceeded, the control valve A is opened to prevent damage to the turbo heater 4, and simultaneously, to prevent a lowering of the fuel consumption rate.

According to the present invention, an excellent engine startup is ensured by a supply of high temperature air to the engine cylinders immediately the engine is driven by the starter motor, and the production or exhaust of unburned hydrocarbons is suppressed. Further, since a rapid rise in the speed of the engine during startup occurs, the temperature of the lubricating oil rises rapidly, and as a result, the lubrication efficiency at all parts of the engine body and at the turbo heater bearings is improved, and thus the durability of the engine and the turbo heater is improved.

Although the invention has been described with reference to specific embodiments chosen for purposes of illustration, it should be apparent that numerous modifications could be made thereto by those skilled in the art without departing from the basic concept and scope of the invention.

We claim:

1. A device for heating a passenger compartment and warming up an engine and having an intake passage and an exhaust passage, said device comprising:
   a turbo heater means for drawing and heating air from an ambient air source and delivering hot, pressurized air, the turbo heater having a blower with an inlet side and a discharge side and turbine means for driving the blower including a turbine driven by exhaust gas discharged from the engine into the exhaust passage;

a hot air passage connected to the passage compartment;

selective connecting means for selectively connecting said discharge side of said blower to said hot air passage or the intake passage;

control means for controlling said selective connecting means to connect said discharge side of said blower to the intake passage during a predetermined period after the engine is started and to connect said discharge side of said blower to said hot air passage after said predetermined period has elapsed.

2. A device according to claim 1, wherein said predetermined period is a constant time.

3. A device for heating a passenger compartment and warming up an engine having an intake passage and an exhaust passage, said device comprising:

a turbo heater having a blower and a turbine connected to said blower and driven by exhaust gas discharged from the engine into the exhaust passage to discharge hot air from a discharge side of said blower;

a turbo heater means for drawing and heating air from an ambient air source and delivering hot, pressurized air, the turbo heater having a blower with an inlet side and a discharge side and turbine means for driving the blower including a turbine driven by exhaust gas discharged from the engine into the exhaust passage;

a hot air passage connected to the passenger compartment;

selective connecting means for selectively connecting said discharge side of said blower to said hot air passage or the intake passage; and control means for controlling said selective connecting means to connect said discharge side of said blower to the intake passage during a predetermined period after the engine is started and to connect said discharge side of said blower to said hot air passage after said predetermined period has elapsed; and an exhaust gas flow control valve which controls the inflow of exhaust gas to said turbine of said turbo heater means, said exhaust gas flow control valve supplying exhaust gas to said turbine when said turbo heater means is to be operated and cutting the supply of exhaust gas to said turbine when operation of said turbo heater means is to be stopped.

4. A device according to claim 3, wherein said selective connecting means is provided with a control valve which shuts off the communication between the discharge side of said blower and the said hot air passage and which shuts off the communication between the discharge side of said blower and intake passage, the communication between the discharge side of said blower and said hot air passage being shut off and the communication between the discharge side of said blower and intake passage being shut off when the operation of said turbo heater is to be stopped.

5. A device according to claim 3, further provided with a temperature detection means which detects the temperature of the engine, said turbo heater being operated and the discharge side of the said blower being communicated with the said hot air passage or intake passage by said control means, when the temperature of the engine is lower than a predetermined temperature and the operation of said turbo heater being stopped when the temperature of the engine is higher than said predetermined temperature.

6. A device according to claim 3, further provided with a temperature detection means which detects the temperature of the engine and a back pressure detection means which detects the back pressure in the exhaust passage between the engine and the said turbine, said turbo heater being operated and the discharge side of said blower communicated with said hot air passage or intake passage by said control means when the temperature of the engine is lower than a predetermined temperature, said turbo heater being operated and the discharge side of said blower communicated with the intake passage when the temperature of the engine is higher than said predetermined temperature and said back pressure is lower than a predetermined pressure, and the operation of said turbo heater being stopped when the temperature of the engine is higher than said predetermined temperature and said back pressure is higher than said predetermined pressure.

7. A device according to claim 3, further provided with a temperature detection means which detects the temperature of the engine and an intake pressure detection means which detects the intake pressure inside the intake passage, said turbo heater being operated and the discharge side of said blower communicated with the said hot air passage or intake passage by said control means when the temperature of the engine is lower than a predetermined temperature, said turbo heater being operated and the discharge side of said blower communicated with the intake passage when the temperature of the engine is higher than the said predetermined temperature and said intake pressure is lower than a predetermined pressure, and the operation of said turbo heater being stopped when the temperature of the engine is higher than said predetermined temperature and said intake pressure is higher than said predetermined pressure.

8. A device according to claim 3, which is provided with a temperature detection means which detects the temperature of the engine and an engine speed detection means which detects the engine speed, the said turbo heater being operated and the discharge side of said blower communicated with said hot air passage or intake passage by said control means when the temperature of the engine is lower than a predetermined temperature, said turbo heater being operated and the discharge side of said blower communicated with the intake passage when the temperature of the engine is higher than said predetermined temperature and said engine speed is lower than a predetermined speed, and the operation of said turbo heater being stopped when the temperature of the engine is higher than said predetermined temperature and said engine speed is higher than said predetermined speed.

9. A device according to claim 3, further provided with a high temperature indication means showing an outside air temperature, the operation of said turbo heater being stopped when the outside air temperature is higher than a predetermined temperature.

10. A device according to claim 9, wherein said high temperature indication means comprises a switch operating in accordance with the outside air temperature.

11. A device according to claim 9, wherein said high temperature indication means comprises a manual switch.

12. A device according to claim 3, wherein said exhaust gas flow control valve is disposed inside the exhaust passage, the exhaust passage upstream of said exhaust gas flow control valve and the exhaust passage downstream of said exhaust gas flow control valve are mutually connected through a bypass passage, and said turbine of said turbo heater is disposed inside said bypass passage, said exhaust gas flow control valve being closed when said turbo heater is to be operated and said exhaust gas flow control valve being opened when the operation of said turbo heater is to be stopped.

13. A device according to claim 12, wherein part of the exhaust passage is formed in an exhaust manifold and the exhaust passage around said exhaust gas flow control valve has a sectional area not smaller than the sectional area of the cluster portion of the said exhaust manifold.

14. A device according to claim 12, wherein said bypass passage is provided with an exhaust gas flow inlet and an exhaust gas flow outlet which adjoin said exhaust gas flow control valve and open inside an exhaust passage.

15. A device according to claim 1, wherein said selective connecting means is provided with a hot air control valve which is disposed in said hot air passage and is controlled by said control means, a connecting passage which connects the discharge side of said blower and the intake passage, and a heating control valve which is controlled by said control means and controls the opening of the connecting passage, said hot air control valve being opened and said connecting passage being closed by said heating control valve when the discharge side of said blower is connected to said hot air passage and said hot air control valve being closed and said heating control valve opening said connecting passage when the discharge side of said blower is connected to the intake passage.

16. A device according to claim 15, wherein said heating control valve is disposed at the connecting portion of said connecting passage and intake passage, the intake passage being opened when said connecting passage is closed by said heating control valve, the intake passage upstream of said connecting portion being closed by said heating control valve when said heating control valve opens said connecting passage.

17. A device according to claim 1, further provided with a auxiliary intake passage disposed around the intake passage, the intake side of said blower being connected to said auxiliary intake passage.

18. A device according to claim 1, wherein a heater utilizing heat generated by the engine is mounted in the passenger compartment.

19. A device according to claim 18, wherein said heater is heated by coolant water of the engine.

* * * * *